United States Patent [19]

Wilhelmi et al.

[11] 4,037,754
[45] July 26, 1977

[54] CLOSURE PLUG

[75] Inventors: Julius B. Wilhelmi, Hull, Mass.;
Roger E. Somers, Hudson, N.H.

[73] Assignee: TRW Inc., Cleveland, Ohio

[21] Appl. No.: 747,847

[22] Filed: Dec. 6, 1976

[51] Int. Cl.² .................. B65D 51/18; B65D 51/00;
B65D 51/16
[52] U.S. Cl. ........................... 220/254; 141/350;
220/229; 220/335; 220/339; 220/361; 220/85 F
[58] Field of Search ............... 220/229, 254, 259, 307,
220/335, 339, 337, 361, 85 F, 306, 307; 141/350

[56] References Cited
U.S. PATENT DOCUMENTS

| 2,213,465 | 9/1940 | Gay | 220/229 X |
| 2,800,244 | 7/1957 | Witt | 220/254 |
| 3,315,402 | 4/1967 | Scott et al. | 220/229 X |

Primary Examiner—William Price
Assistant Examiner—Steven M. Pollard
Attorney, Agent, or Firm—James R. O'Connor; Thomas C. O'Konski; Martin J. O'Donnell

[57] ABSTRACT

A closure plug particularly useful in the manufacture of insulated closures such as refrigerator and freezer cabinets. The plug comprises a molded, one-piece resilient plastic body member including a peripheral portion for sealingly engaging the edges of an opening in the closure, a central portion extending inwardly from the peripheral portion and defining an aperture communicating with the opening, first and second relatively flexible flaps extending above the central portion and overhanging the aperture and first and second relatively rigid tabs extending from the central portion between the flaps toward the center of the aperture. The flaps are deformable past the tabs through the aperture of permit the insertion of an insulative foam introducing conduit into the closure. Upon withdrawal of the conduit, the flaps tend to return to their original position outside the aperture but are restrained from passing back through the aperture by the tabs. The flaps thus assume a relatively flat, overlapped position beneath the tabs and seal the aperture and the foam in the closure.

11 Claims, 7 Drawing Figures

CLOSURE PLUG

BACKGROUND OF THE INVENTION

A. Field of the Invention

The invention relates to a closure plug and, more particularly, to a closure plug which opens to provide ready passage of a conduit therethrough and which thereafter closes tightly on withdrawal of the conduit.

B. Prior Art

In the manufacture of insulated closures, such as refrigerator and freezer cabinets, it is a common practice to fabricate the closure in the form of a rigid hollow shell with one or more access openings and subsequently to fill the shell through the openings with an insulative resin foam such as polyurethane foam. The foam is typically introduced into the shell in an uncured state through a foam nozzle or conduit and then allowed to cure and solidify within the shell. In order for the foam to fill the shell completely, air trapped in the shell and gaseous agents accompanying the foam must be allowed to vent through the opening during filling. However, once the shell is filled, it is desirable to seal the opening to prevent leakage of the foam and to maintain a positive foam pressure within the shell during curing. Closure plugs of various designs have heretofore been used for this purpose.

One such closure plug is described in U.S. Pat. No. 3,739,963. This plug is designed to be snapped in an access opening in the closure shell being filled. The main portion of the plug has a plurality of slits defining a plurality of resilient flaps which normally occupy a common plane and seal the opening. The plug also includes a liner of a flexible material which is also slit but at such locations that the slits in the liner are offset from the slits in the main portion. With this construction, the flaps and liner can be deformed to allow the passage of the foam nozzle or conduit through the plug for the introduction of the resin into the shell. After withdrawal of the conduit, the flaps and liner return to their normal positions to seal the opening and prevent leakage of the foam.

Closure plugs of the type described in the above patent are generally fabricated using at least two different plastic materials, one for the main portion of the plug, and the otherfor the flexible inner liner. In order for the slits in the main portion of the plug to be offset from those in the liner, the slits must be cut prior to securing the main portion and liner together. Finally, the main portion and liner must be suitably secured together typically by using a layer of adhesive therebetween. Each of these steps adds to the complexity and cost of manufacturing the plugs.

SUMMARY OF THE INVENTION

It is, therefore, an object of this invention to provide an improved closure plug.

Another object of the invention is to provide an improved closure plug for an opening in a closure that permits the passage of a conduit therethrough for the introduction of a substance into the closure and that seals the opening upon withdrawal of the conduit.

Still another object of the invention is to provide a closure plug of the type described which is relatively simple and inexpensive to manufacture.

A closure plug in accordance with the present invention has a one-piece construction and thus may be economically fabricated from a single resilient material, such as a synthetic plastic, using essentially a one step process, such as injection molding.

A plug embodied in accordance with the invention includes a peripheral flange portion for sealingly engaging the edges of a closure wall defining an opening to be sealed, a central portion extending inwardly from the peripheral portion and defining outer and inner opposed major faces of the plug and an aperture through the central portion, first and second relatively flexible flap portions extending above the outer face from two opposed sides of the aperture, and first and second relatively rigid tab portions extending from the other two opposed sides of the apertures toward the center of the plug.

The flap portions initially project above the outer face of the plug and above the tab portions. The plug is snapped into an opening in a closure, for example, an access opening in a refrigerator cabinet to be filled with insulative foam. The flap portions can be bent or deformed past the two tab portions so that they project through an aperture to the inside of the closure to allow passage of a foam conduit through the aperture for introducing the foam into the closure. The aperture in the plug is preferably wider than the outer dimensions of the foam conduit so that, when the conduit is inserted in the plug, a passage is provided on either side of the conduit through which air and gaseous foam agents can escape from the closure during the filling. When the filling is completed and the foam conduit is withdrawn from the plug, the flap portions tend to return to their initial positions but are restrained from passing back through the aperture by the relatively rigid tab portions. The flap portions thus assume a relatively flat, overlapping position beneath the tab portions and seal the aperture in the plug, thereby preventing the escape of the foam resin therethrough.

BRIEF DESCRIPTION OF THE DRAWING

The foregoing and other objects, features and advantages of the invention will be better understood from the following detailed description taken in conjunction with the accompanying drawing in which.

DETAILED DESCRIPTION OF ILLUSTRATIVE EMBODIMENT

Figure 1:
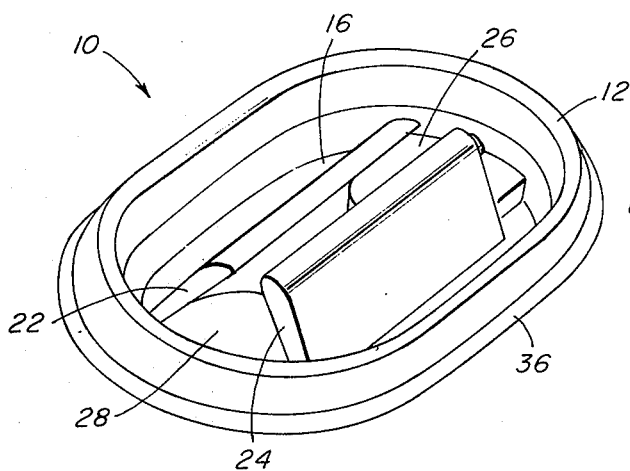
FIG. 1 is a perspective view showing a closure plug in accordance with the invention.
Figure 3:
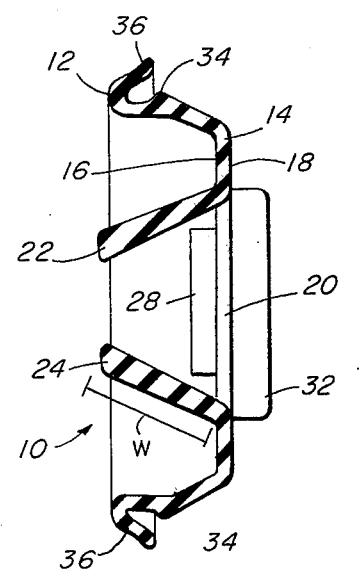
FIG. 3 is a sectional view taken along line 3—3 of FIG. 2.
Figure 2:
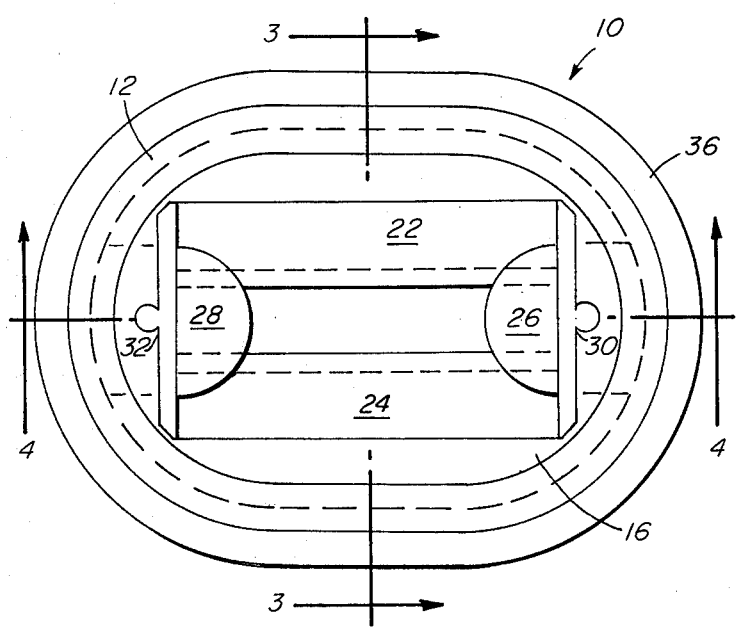
FIG. 2 is a bottom plan view of the closure plug of FIG. 1.

Referring to the drawing in detail, there is illustrated a closure plug embodying the invention, generally indicated by the numeral 10, which closure plug is preferably molded as a one-piece member from polyethylene, polypropylene, nylon or other similar resilient plastic material.

As shown in FIGS. 1–4, the closure plug 10 includes a peripheral portion 12 and a central portion 14 (FIG. 3) that is recessed relative to the peripheral portion 12 and that extends inwardly therefrom. The central portion 14 includes an outer face 16 and an inner face 18 and defines an aperture 20 that is illustratively of an elongated rectangular shape and that provides a passage through the plug 10. First and second integral flaps 22 and 24 project from the edges of the outer face 16 defining the aperture 20 and, more specifically, from the longer pair of parallel sides of the aperture 20. Each of the flaps 22 and 24 is preferably relatively flexible at its base and projects at an angle less than 90° to the outer face 16 so that it inclines toward and over the aperture 20 rather than toward the peripheral portion 12 of the plug 10. Also, each of the flaps 22 and 24 has a width W (FIG. 3) that is greater than one half the width of the aperture 20 so that the flaps 22 and 24 overlap if they are deformed into the plane of the aperture 20.

Figure 4:
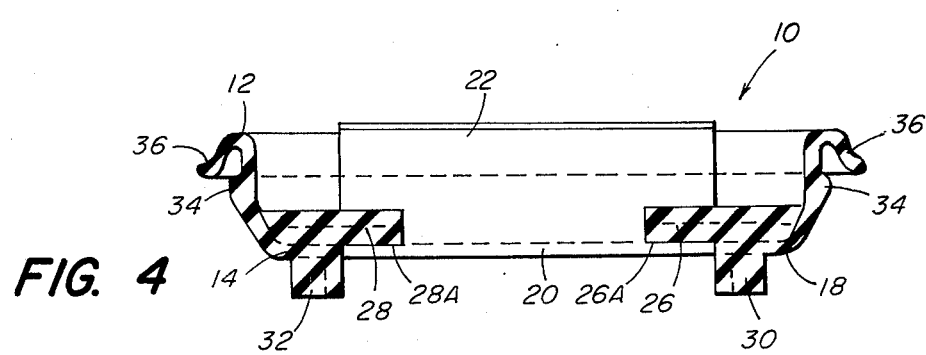
FIG. 4 is a sectional view taken along lne 4—4 of FIG. 2.

Also extending from the outer face 16 of the plug 10 is a pair of integral tabs 26 and 28. The tabs 26 and 28 extend from the two shorter sides of the aperture 20 toward its center beneath the flaps 22 and 24. The tabs 26 and 28 are preferably made somewhat thicker than the base portions of the flaps 22 and 24, as indicated in FIG. 4, so as to be relatively more rigid but still resiliently yieldable when sufficient force is applied to them. The ends of the tabs 26 and 28 are also preferably rounded, e.g., of a semi-circular shape. As best seen in FIG. 4, the tabs 26 and 28 project above the outer face 16 of the plug 10 so that the inside surfaces 26A and 28A of the tabs 26 and 28 are in essentially the same plane as the outer face 16. Reinforcing rib structures 30 and 32 depend from the inner face 18 of the plug 10 beneath each of the two shorter sides of the aperture 20. The rib structures 30 and 32 serve to strengthen the plug 10 by resisting bending about the long axis thereof.

Figure 5:
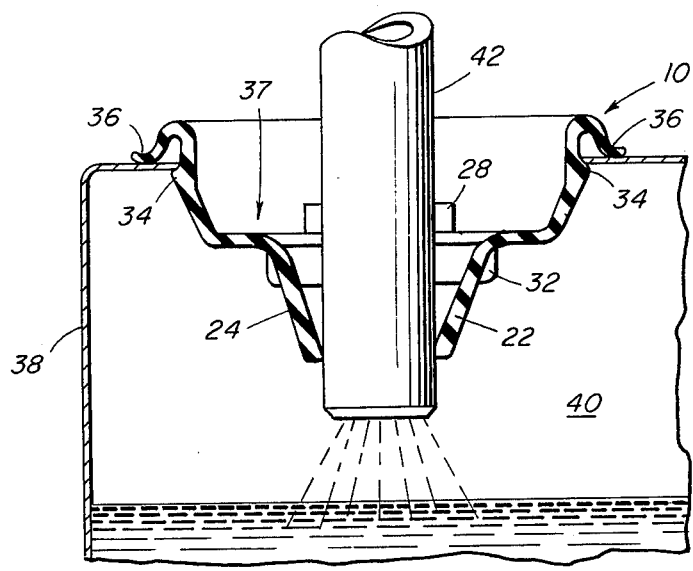
FIG. 5 is a view similar to FIG. 3 showing a foam conduit inserted through the closure plug for introduction of foam into a closure such as a refrigerator cabinet.
Figure 6:
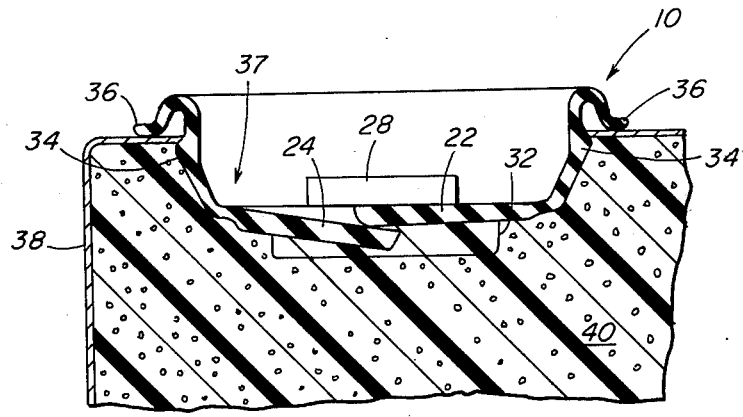
FIGS. 6 and 7 are sectional views corresponding to the sections of FIGS. 3 and 4, respectively, but showing the configuration assumed by the closure plug upon withdrawal of the foam conduit.
Figure 7:
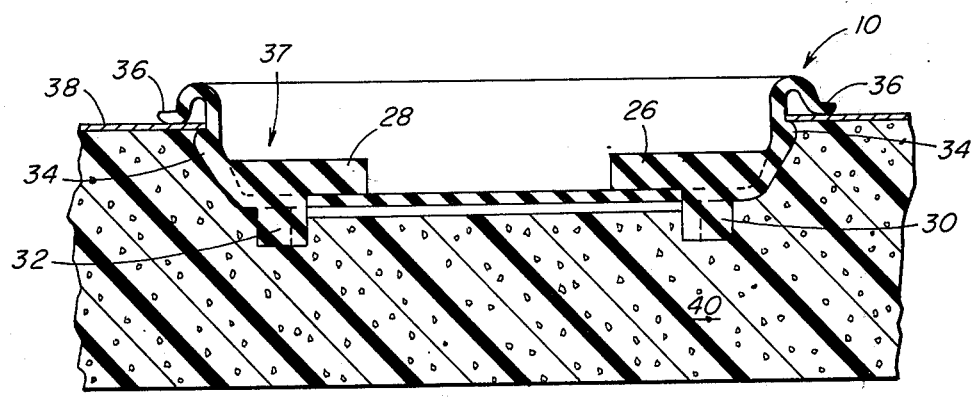

The peripheral portion 12 of the plug 10 is arranged so that the plug 10 can be snapped into a correspondingly shaped opening in a closure wall to be sealed. Specifically, the peripheral portion 12 of the plug 10 includes an outwardly extending shoulder 34 and an outwardly and downwardly depending flange 36 that extend completely about the circumference of the plug 10. As shown in FIGS. 5-7, the plug 10 may be pressed into an opening 37 in a closure wall 38 until the shoulder 34 engages beneath the inner edges of the wall 38 at the opening 37. In this position, because of the resilient nature of the plug material, the flange 36 is drawn tightly against the outside surface of the wall 38 adjacent the opening 37. The shoulder 34 and flange 36 cooperate to sealingly engage the wall 38 and to hold the plug 10 firmly in place in the opening 37.

As noted, the plug 10 is particularly useful in the manufacture of insulated closures such as refrigerator and freezer cabinets of the type including an outer wall and an inner wall defining a wall cavity that is filled with a liquid foamable resinous material such as polyurethane foam. Accordingly, the wall 38 shown in FIGS. 5-7 is illustratively the outer wall of such a two-walled refrigerator cabinet structure, the cavity 40 within the wall 38 is the wall cavity to be filled with the foam, and the opening 37 is the opening through which the foam is to be introduced.

In use, the plug 10 is snapped into the opening 37 prior to the introduction of the foam. Thereafter, as shown in FIG. 5, a foam conduit 42 is inserted through the plug 10. As the conduit 42 is pushed downwardly toward the plug 10, it bends or deforms the flaps 22 and 24 downwardly until they flex sufficiently to pass the relatively rigid tabs 26 and 28 and project through the aperture 20 into the cavity 40. The conduit 42 is pushed until the free end thereof clears the flaps 22 and 24 and the foamable liquid is then introduced through the conduit 42 into the cavity 40, as indicated in FIG. 5.

The conduit 42, which in most cases has the cylindrical shape shown, does not completely fill the rectangular aperture 20 in the plug 10. As a result, space is provided on either side of the conduit 42 through which air in the cavity 40 and gaseous agents accompanying the foam can escape during filling of the cavity 40. This space is desirable in preventing the gases from becoming trapped in the cavity 40 and creating voids in the resultant foam.

After a sufficient quantity of foam has been introduced into the cavity 40, the flow of the foam through the conduit 42 is terminated and the conduit 42 is withdrawn from the plug 10. The resilient nature of the flaps 22 ans 24 causes them to tend to return to their initial positions projecting above the outer face 16 of the plug 10, as illustrated in FIGS. 1-4. However, the flaps 22 and 24 are prevented from passing back through the aperture 20 by the relatively rigid tabs 26 and 28. The flaps 22 and 24 thus assumes the relatively flat, overlapping position illustrated in FIGS. 6 and 7. In this position, sufficient space is provided between the flaps 22 and 24 and the edges of the aperture 20 to permit the escape of gases from within the cavity 40 during curing of the foam. However, the flaps 22 and 24 otherwise seal the aperture 20 sufficiently to prevent the leakage of foam therethrough and to maintain a positive foam pressure during curing.

In summary, therefore, we have described a closure plug that is easily inserted and firmly held within an opening in a closure, that readily permits the passage of a conduit therethrough for introduction of a substance into the closure and that effectively seals the opening against escape of the substance upon withdrawal of the conduit. The plug is particularly advantageous because of its relatively simple, one-piece construction which facilitates its economic fabrication in large quantities from a single resilient material, such a low density polyethylene, using conventional plastic molding processes such as hot injection molding. There in no need to fabricate parts of the plugs separately or from different materials. There is no need to secure separately fabricated parts together.

It is to be understood that the closure plug 10 described above and shown in the drawing is illustrative of only one specific embodiment of the invention and that modifications thereof may be made by those skilled in the art without departing from the scope of the invention as defined by the appended claims. Also, while the plug 10 has been described above for use in the manufacture of insulated closures such as refrigerator and freezer cabinets, other uses of the plug 10 will be realized by those skilled in the art.

What we claim as new and desire to secure by Letters Patent is:

1. A closure plug for an opening in a closure that permits passage of a conduit therethrough for introducing a substance into the closure and that seals the opening against the escape of the substance upon withdrawal of the conduit, comprising:
   an integral, resilient body member including A. a peripheral portion for sealingly engaging the closure around the periphery of the opening;

B. a central portion extending inwardly from said peripheral portion and defining outer and inner major faces and an aperture communicating with the opening;

C. first and second flap portions extending above the outer face of said central portion from opposed sides of the aperture; and D. first and second tab portions extending from said central portion between said flap portions toward the center of the aperture;

E. whereby said flap portions may be deformed past said tab portions through the aperture to allow the passage of the conduit therethrough and whereby, upon withdrawal of the conduit, said flap portions resiliently assume a relatively flat, overlapped position in contact with said tab portions to seal the aperture against escape of the substance therethrough.

2. A closure plug as recited in claim 1 in which said peripheral portion includes a circumferential shoulder for engaging beneath the inner edge of the closure at the opening and a circumferential flange overhanging said shoulder for resiliently engaging the outer edge of the closure at the opening.

3. A closure plug as recited in claim 1 in which said flap portions are inclined relative to the outer face of said central portion so as to overhang the aperture.

4. A closure plug as recited in claim 1 in which said flap portions are significantly more flexible relative to said central portion that are said tab portions.

5. A closure plug as recited in claim 1 in which the ends of said tab portions extending toward the center of the aperture are rounded to facilitate the deflection of said flap portions thereby.

6. A closure plug as recited in claim 1 further including reinforcing rib structures depending from the inner face of said central portion and extending laterally beneath said tab portions.

7. A closure plug as recited in claim 1 in which said body member comprises a molded, one-piece body member of resilient plastic material.

8. A closure plug as recited in claim 7 in which said body member is fabricated from polyethylene.

9. A closure plug for sealing an opening in a closure comprising:

a molded, one-piece resilient body member including

A. a peripheral portion for sealingly engaging the closure around the periphery of the opening including a circumferential shoulder for engaging beneath the inner edge of the closure at the opening and a circumferential flange overhanging said shoulder for resiliently engaging the outer edge of the closure at the opening;

B. a central portion extending inwardly from said peripheral portion and defining outer and inner major faces and a rectangular aperture communicating with the opening and having a length greater than its width;

C. first and second generally rectangular flaps initially extending above the outer face of said central portion from opposed sides of the aperture, said flaps being resiliently deformable relative to said central portion and having a width greater than one half the width of the aperture so that said flaps overlap when deformed into the plane of the aperture; and D. first and second relatively rigid tabs extending from said central portion between said flaps toward the center of the aperture for preventing a return of said flaps to their initial positions above the outer face of said central portion after deformation of said flaps past and below said tabs.

10. A closure plug as recited i claim 9 in which said tabs are of a semi-circular shape so as to facilitate the deflection of said flaps past and below said tabs.

11. A closure plug as recited in claim 9 in which said body member is fabricated from polyethylene.

* * * * *